United States Patent [19]
Baker et al.

[11] Patent Number: 5,397,872
[45] Date of Patent: Mar. 14, 1995

[54] WELD MONITOR SYSTEM

[75] Inventors: Robert K. Baker, Medina; Steven J. Wasylko, Brunswick, both of Ohio

[73] Assignee: Par Industries Inc., Medina, Ohio

[21] Appl. No.: 166,224

[22] Filed: Dec. 13, 1993

[51] Int. Cl.⁶ .............................................. B23K 11/25
[52] U.S. Cl. ................................... 219/109; 219/117.1
[58] Field of Search ...................... 219/109, 110, 117.1, 219/86.51

[56] References Cited

U.S. PATENT DOCUMENTS

| | | | |
|---|---|---|---|
| 3,553,420 | 1/1971 | Shearer, Jr. et al. | 219/110 |
| 3,573,416 | 4/1971 | Drechsler | 219/110 |
| 3,616,985 | 11/1971 | Koch . | |
| 3,665,146 | 5/1972 | Morris et al. . | |
| 4,332,998 | 6/1982 | Boros . | |
| 4,447,700 | 5/1984 | Cohen | 219/110 |
| 4,514,613 | 4/1985 | Hill et al. . | |
| 4,562,330 | 12/1985 | Hamilton | 219/109 |
| 4,573,249 | 3/1986 | Shellhause . | |
| 4,585,918 | 4/1986 | Corrigan et al. | 219/109 |
| 4,945,201 | 7/1990 | Ito et al. | 219/110 |
| 5,071,056 | 12/1991 | Sheets et al. . | |
| 5,137,203 | 8/1992 | Johannesen . | |
| 5,138,127 | 8/1992 | Fries et al. | 219/109 |

OTHER PUBLICATIONS

"Weld Sentry TM State of the art weld monitoring" Specification sheets Nov. 1991 (8 pages).

*Primary Examiner*—Clifford C. Shaw
*Attorney, Agent, or Firm*—Calfee Halter & Griswold

[57] ABSTRACT

A weld monitor system measures and records physical conditions under which welds are made between parts weld fused by an automated welding machine. Analog data of pressure in hydraulic circuits of hydraulically driven operations of an automatic welding machine, and analog data of weld current amperages applied to welding electrodes of the welding machine is acquired and stored by the weld monitor system to provide an archival record of the physical conditions of the formation of all welds made by the automatic welding machine. The weld monitor system compares the data to a predetermined range of values and sends a control signal to a welding machine controller indicative of the results of the data comparisons. An automatic part identification unit of the weld monitor system sequentially applies permanent unique indicia to parts weld assembled so that weld assembly data for uniquely identified parts can be readily retrieved from the stored data. Welding condition data acquired by the weld monitor system provides a broad range source of production process data on which to perform statistical process control analysis.

25 Claims, 5 Drawing Sheets

WELD MONITOR SYSTEM

FIELD OF THE INVENTION

The present invention relates in general to monitoring of automatic welding operations and automatic welding machines and, in particular, to monitoring and capture of data on physical conditions under which parts are joined by welds formed by an automatic welding machine.

BACKGROUND OF THE INVENTION

Automatic welding machines are used in manufacturing and automated production assembly lines to continuously perform welding of cooperating parts. For example, automated resistance spit welding of parts in an assembly line set-up is performed generally by conveyance of the parts to be welded into an automatic welding unit which holds the parts in specified relative positions, places electrodes into contact at appropriate positions upon the parts with compressive force, and applies current to the weld electrodes to flow through the parts held in compression. For assembly line manufacture of a succession of identical end products such as, for example, brake shoes, stand alone machines have been devised which receive, convey and manipulate the parts into the correct position for welded assembly, automatically perform the welding process on the parts at specific weld locations, and conveys the completed welded part on to a subsequent step in the manufacturing process. One such automatic brake shoe welding machine is the Par Industries, Inc. H-BSAR-GS-EPR Hydraulic Automatic DC Brakeshoe Welder manufactured by Hess Engineering, Inc. of Niles, Mich. U.S.A. under license from Ottenser Eisenwerke GmbH Hamburg, West Germany.

Of course, in automatic welding of brake shoes, the quality and strength of the welds is critical both to the performance of the brake shoe and the safety of the vehicle in which it is ultimately installed. To acquire data on the quality and physical strength of welds made by an automatic welding machine, a random sampling of welded assemblies is made for destructive testing and measurement. For example, two brakeshoes may be selected from the production line within a single thirty minute time interval and destructively tested by forced separation of the welds between the rim and web components. Weld nuggets formed by the resistance welding process are then inspected and measured for a minimum content of material broken away from the welded components. Such random testing gives only limited data on the strength and quality of all welds made in a production run, and yields no direct or exact data on the physical conditions under which the welds were formed.

Welding current monitors have been devised to measure voltage, current and time values in resistance welding and compare measured values to defined limits as a form of weld process control. Such monitors do not, however, monitor other physical conditions attendant the welding process such as machine pressures which exert compressive forces upon the parts during weld joining, and pressures applied to weld assembled parts in automated finishing or dimensioning operations. Nor do such monitors correlate weld condition data to the exact parts weld assembled thereunder.

Thus a need exists for real time monitoring of a broad range of physical conditions under which parts are joined by welding performed by an automatic welding machine to monitor machine functions together with weld current, and to provide a complete record of values of conditions monitored correlated to each particular part weld assembled by the machine.

SUMMARY OF THE INVENTION

The present invention provides a weld monitoring system for monitoring and recording data of physical conditions of a welding operation performed by an automatic welding machine.

In one embodiment of the invention, a weld monitor system for monitoring physical conditions of an automatic welding operation in which welds parts are welded together by an electric/pressure welding process includes a current measuring device for measuring current applied to welding electrodes of an automatic welding machine, pressure gauges for measuring pressures applied by the automatic welding machine to parts as they are joined by welds formed by the electrodes of the automatic welding machine, and a recording device for recording values measured by the current measuring device and pressure gauges.

Another aspect of the invention is a method of monitoring physical conditions under which parts are weld assembled by a welding machine which includes the steps of measuring amperes of welding pulses and weld cycle duration applied to welding electrodes of an automatic welding machine, and simultaneously measuring pressures applied by the welding machine to parts as the parts are joined by welds formed between the electrodes of the welding machine.

In another embodiment of the invention, a weld monitor device which monitors physical conditions under which welds are made in parts weld assembled by an automatic welding machine includes a welding current measuring device for measuring current applied to welding electrodes placed in contact with parts to be weld joined, and pressures applied by the welding machine to parts as they are welded together by the welding electrodes of the welding machine.

To the accomplishment of the foregoing and related ends the invention then comprises the features hereinafter described in detail and particularly pointed out in the claims, the following description and referenced drawings setting forth in detail certain illustrative embodiments of the invention, these being indicative however of but a few of the various ways in which the principles and concepts of the invention may be employed.

DETAILED DESCRIPTION OF THE PREFERRED EMBODIMENT

Figure 1A:
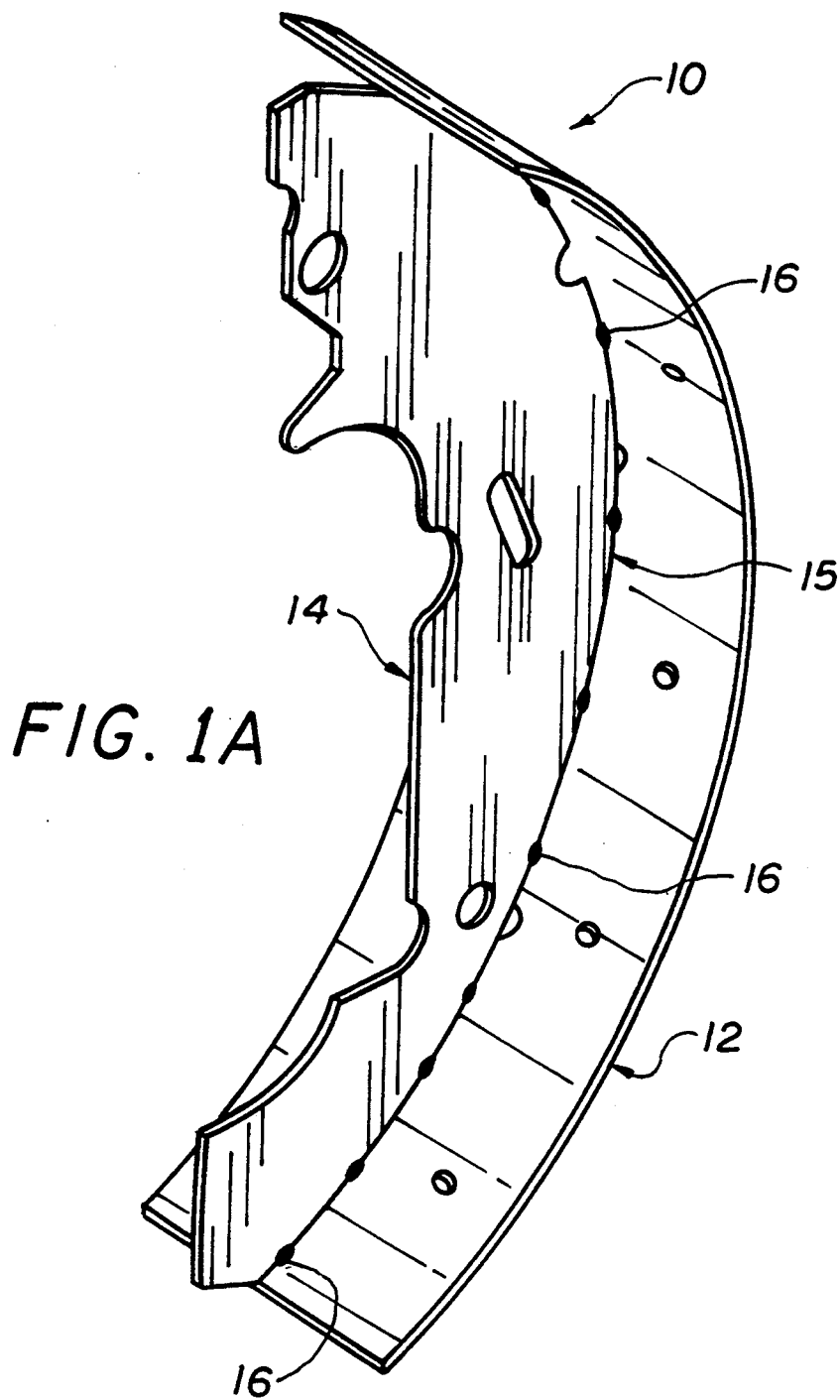
FIGS. 1A and 1B are perspective views of a weld assembled brake shoe.
Figure 1B:
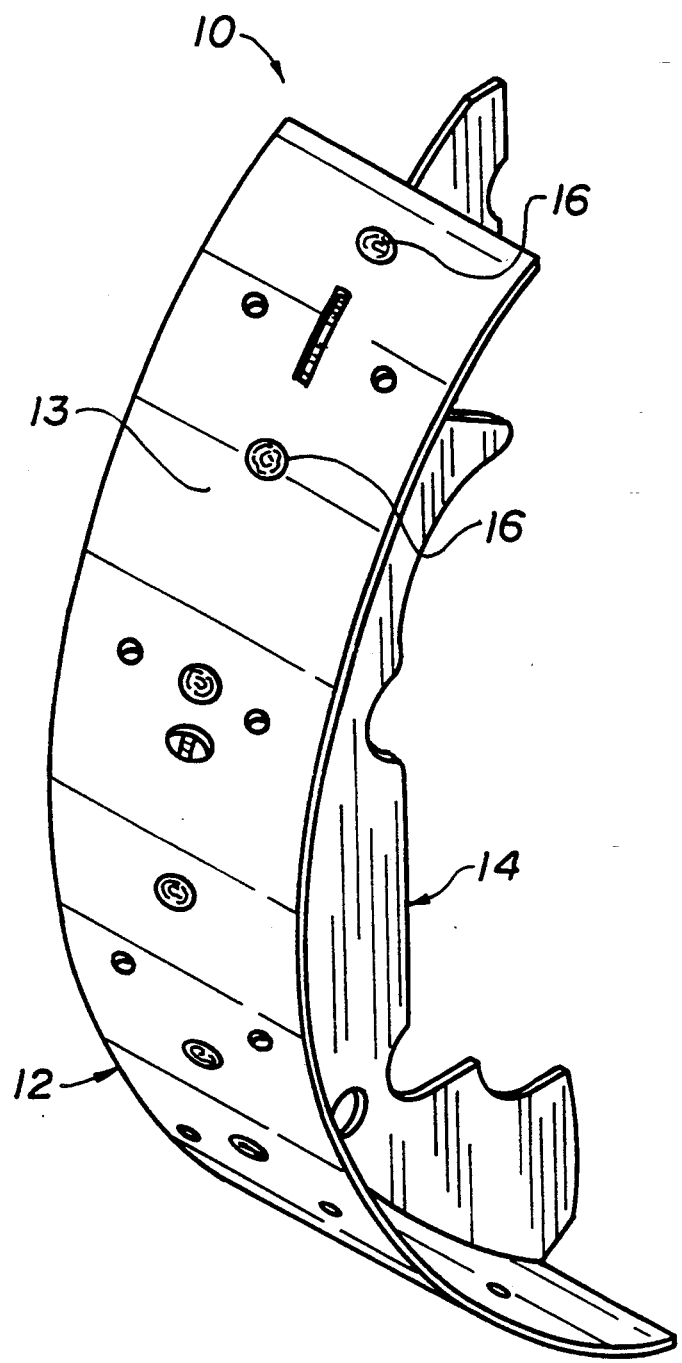

FIGS. 1a and 1b illustrate different perspectives of a brake shoe assembly, indicated generally at 10, which serves as a supporting mounting surface for a brake lining in a drum braking mechanism as commonly used in wheeled vehicles. The brake shoe assembly 10 typically includes an arcuate rim 12 having an outer peripheral surface 13 to a which a brake lining (not shown) is secured, and an arcuate web 14, oriented in a plane perpendicular to the curved plane of the rim and having an outer peripheral edge 15 which is attached by weld fusion at multiple weld points 16 linearly spaced along a longitudinal centerline of rim 12.

Figure 2:
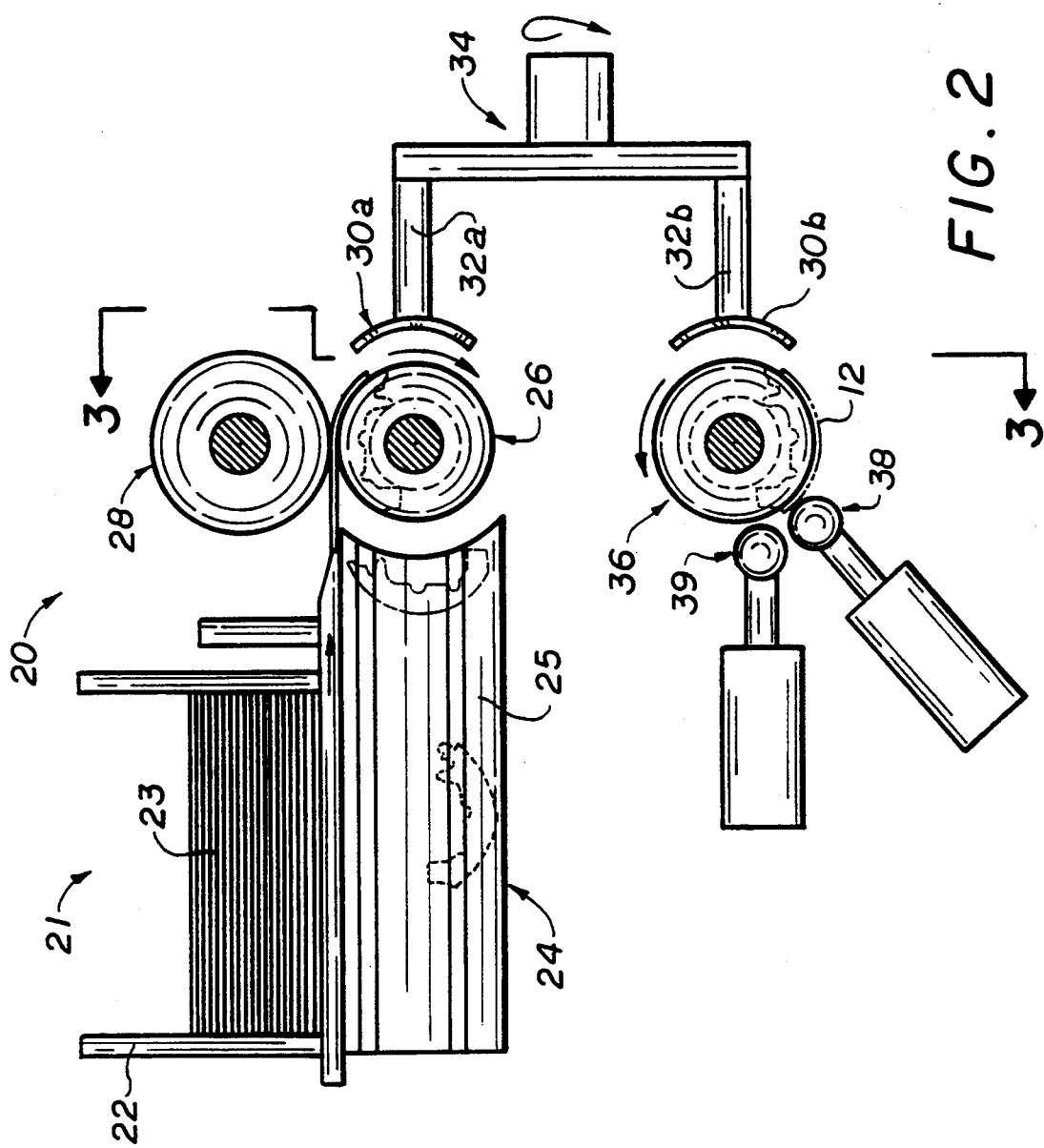
FIG. 2 is a schematic diagram of a portion of an automatic brake shoe welding machine.
Figure 3:
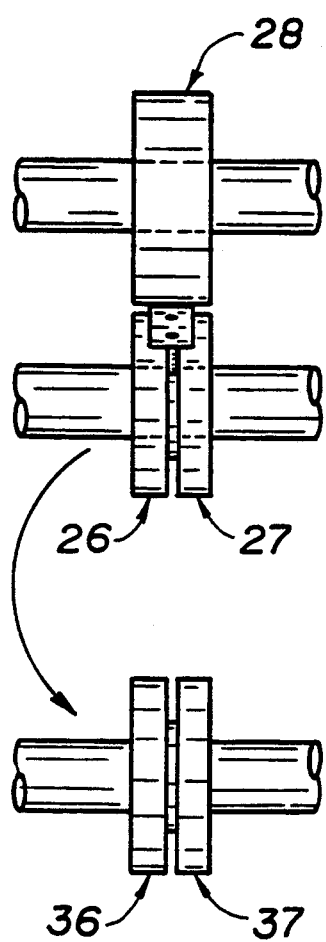
FIG. 3 is a schematic diagram taken in the direction of arrows 3—3 of FIG. 2.

FIGS. 2 and 3 schematically illustrate one type of an automatic brake shoe welding machine, indicated generally at 20, which automatically orients one rim and one web in the correct assembled position, makes welds 16 (such as for example by resistance spot welding as is known in the art) along the line of intersection of the two parts, and planishes the welded brake shoe assembly to correct dimensions. The automatic welding machine 20 includes a rim feeder 21 having a magazine 22 for receiving and positioning a plurality of pre-cut rim blanks 23, which are in a flat configuration, in the horizontal stacked arrangement shown. A web feeder 24 includes a magazine 25 for receiving and positioning a plurality of webs 14 in a vertical side-by-side arrangement initially in the horizontal position shown in the magazine, and subsequently in the upright position shown at the forward end of the magazine.

In the automatic welding process of one web 14 to one rim 12, a single web 14 is linearly advanced in the upright position by web feeder 24 onto a lower electrode 26, which as shown in FIG. 3, forms a weld nest with a pressure ring 27 which compressively grips the web (with peripheral edge 15 slightly protruding above the periphery of lower electrode 26 and pressure ring 27) against the lower electrode 26 to hold the web in this position and rotate it in unison with the lower electrode in the radial direction indicated. As the web is fed into and clamped in this position in the weld nest, driven rotation of the lower electrode rotates the web (and the pressure ring). As the leading end of peripheral edge 15 of web 14 is positioned at the radial top of the lower electrode, a single rim blank 23 is linearly advanced by rim feeder 21 in the direction indicated for travel into tangential contact with the leading end of peripheral edge 15 of the web at which point in space and time a first resistance spot weld is made at the tangential point of contact of the rim blank and the web under the compressive force of an upper electrode 28, driven into compressive rotational contact with the rim blank 23 in contact with peripheral edge 15 of web 14 upon application of positive and negative welding charges applied to the upper and lower electrodes. Application of short-duration low-voltage/high amperage pulses to the upper and lower electrodes generates sufficient heat through electrical resistance to fuse the rim to the web at the tangential point of contact in the form of a fused nugget of weld metal. Continued driven rotation of pressure ring 27 in compressive contact with the web and the lower electrode, and under the compressive force of the upper electrode, rotates the web about the radius of the weld nest and roll forms the rim blank 23 to the radial arc of peripheral edge 15 of the web, with a series of welds being made along the line of intersection of the rim and web by sequential application of welding pulses through the electrodes. The rim 12 is thus conformed and welded to the arc of peripheral edge 15 of web 14 in this manner. At a specified arcuate distance beyond the first weld, a second electric current pulse is generated to pass from electrode 26, through tangent point 25, into lower electrode 24 to form a second weld at the intersection of peripheral edge 15 of web 14 to rim 12. The number of welds so made between the web and rim is therefore dependent upon the rate of rotation of the pressure ring (in compression with the lower electrode), the frequency of welding pulses applied to the electrodes, and the radius of the intersection of the rim and web. For example, ten welds spaced approximately two centimeters (2 cm) apart can be made between a web and rim having an intersection arcuate length of approximately twenty centimeters (20 cm).

Figure 4:
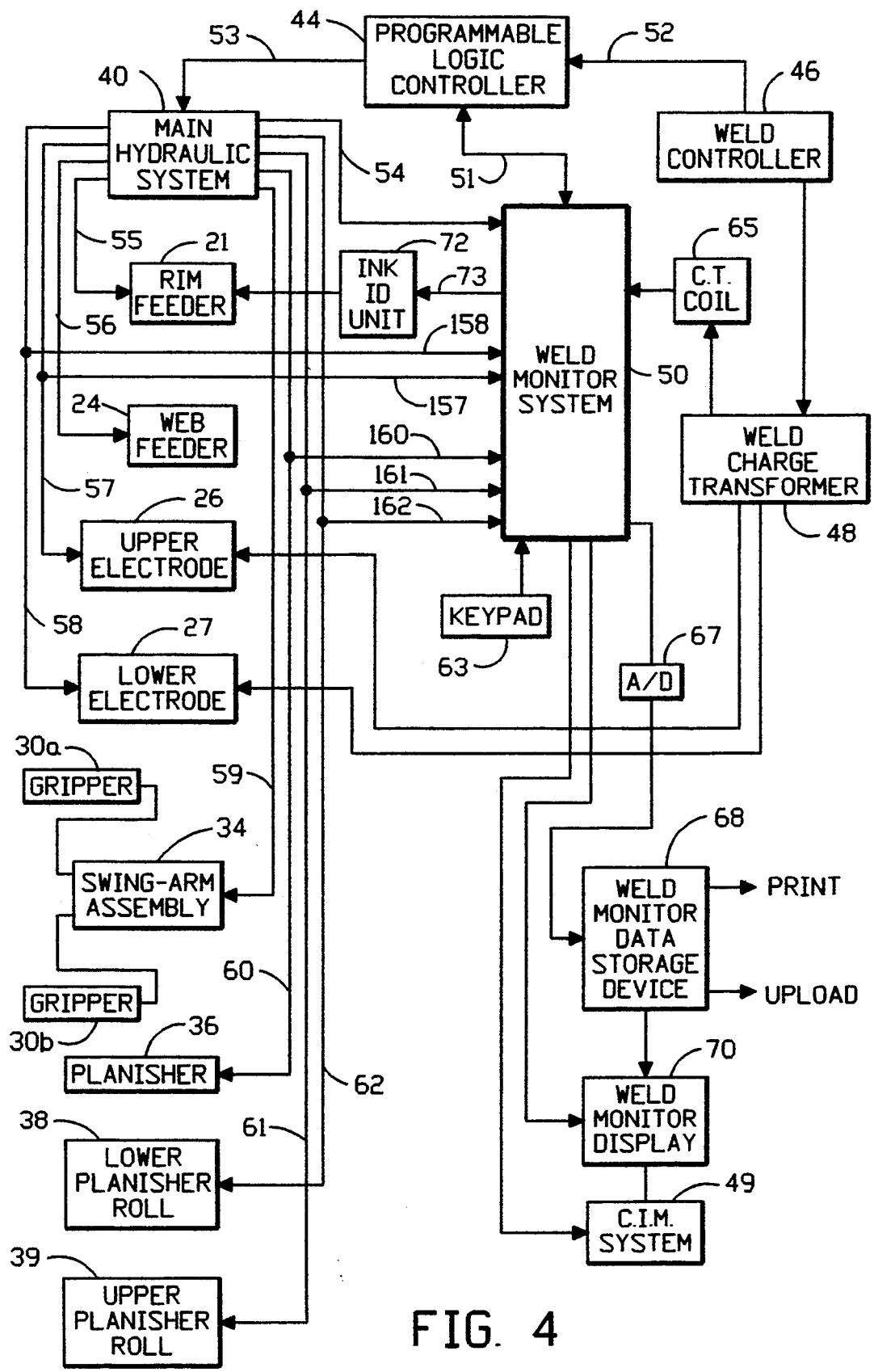
FIG. 4 is a schematic diagram of a weld monitor system and connections with the hydraulic and electric power and control systems of an automatic brake shoe welding machine.

As the trailing end of peripheral edge 15 of web 14 rotates past the radial top of lower electrode 26, following the last of a series of welds along the intersection of the rim and web, the web remains clamped in position in the lower electrode weld nest and is further rotated (along with the rim now welded thereto) to the a position radially adjacent one of two symmetrical brakeshoe grippers 30a and 30b attached to a corresponding gripper arm 32a and 32b extending from a swingarm assembly indicated generally at 34. Brakeshoe gripper 30a, adjacent lower electrode 26, is extended by linear actuation of swingarm assembly 34 to grip the newly welded brake shoe assembly by the rim to remove it from the lower electrode weld nest. The swingarm assembly 34 then linearly retracts and rotates 180 degrees to position the gripped brake shoe assembly in gripper 30a radially adjacent a planisher 36 mounted directly below the lower electrode, as also shown in FIG. 4. The swingarm assembly again linearly extends to release the brakeshoe into clamped engagement in the planisher by compressive clamping of a web clamp 37 against brakeshoe 10 against planisher 36. The outer surface 12 of the rim 12 is thus positioned flush with the outer periphery of planisher 36 and web clamp 37 which is driven to rotate, in the direction indicated in FIG. 2, to carrying the roll formed rim 12 welded to web 14 through rolling compressive contact with a lower planisher roll 38 and an upper planisher roll 39 which calibrate the brake shoe to exact radial dimensions by compressive rolling of outer peripheral surface 13 of rim 12 against the radial surface of planisher 37. The welded and calibrated brakeshoe is then released from the planisher to a receptacle or conveyer and the process repeated. The production rate of such a machine can be as high as one brakeshoe welded and planished every three seconds.

As schematically illustrated by FIG. 4, the mechanical movements of the automatic brake shoe welding machine are hydraulically driven by a central hydraulic unit 40 operatively connected to the various dynamic components of the welding machine including the rim feeder 21, web feeder 24, upper electrode 26, grippers 30a and 30b and swingarm assembly 34, planisher web clamp 37, lower planisher roller 38 and upper planisher roller 39.

A programmable logic controller (PLC) 44, such as for example a Series 6200 PLC 511 manufactured by Allen-Bradley, Inc., controls the operations of main hydraulic unit 40 in conjunction with a weld controller 46 which controls generation and application of weld charges by a weld charge transformer 48 electrically connected to the upper and lower electrodes, to provide synchronized control of the described mechanical motions of the welding machine with the timing, voltage, current and duration of the weld charges applied to the brake shoe parts. The weld controller 46 may be, for example, an electronic three phase multi-program controller, such as the Legend controller manufactured by MEDAR, Inc. of Farmington Hills, Mich., U.S.A., which stores and executes weld programs which dictate the weld charge generation, magnitude, duration and frequency through the weld charge transformer 48 and synchronizes application of weld charges to the electrodes with instructions sent to the PLC for control of the hydraulically driven mechanical operations of the machine. The weld controller 46 may also be programmed to instruct any desired operation, through the PLC and the weld charge transformer, at any point during a particular welding process as indicated by, for example, a specified count per cycle signal of an encoder on the lower electrode and/or planisher.

An electronic weld monitor system 50, which includes multiple data ports for receiving each of the analog inputs of the monitored functions and a central processing unit including comparator and signal generation circuitry is electrically connected to main hydraulic system 40, hydraulic transducers in specified hydraulic circuits of the machine components driven by the main hydraulic system, PLC 44, weld controller 46 and weld charge transformer 48 to provide an integrated monitoring device which reads and records all data on specified physical conditions under which the welds are made, and provides a discrete control output to the PLC according to the measured values of the physical conditions monitored.

The monitoring operations of the weld monitor system 50 are triggered by a discrete input along line 51 from the PLC 44 which receives a weld process initiation signal from weld controller 46 along line 52. The PLC 44 initiates operation of the main hydraulic system 40 by signal along line 53. The main hydraulic system pressure is read by weld monitor system 50 by analog input of an in-line hydraulic pressure transducer in line 54. Hydraulic pressure from the main hydraulic system 40 to each of the hydraulically driven components including; upper electrode 26, lower electrode 27, planisher 36, lower planisher roll 38, and upper planisher roll 39, is also read by the weld monitor system 50 by analog inputs of in-line hydraulic pressure transducers in the respective hydraulic lines 57, 58, 60–62, providing input to the weld monitor system along lines 157,158, 160–162 respectively. By this arrangement, the weld monitor system 50 acquires analog hydraulic pressure data on the hydraulically driven components of the welding machine critical to the weld formation including: upper electrode pressure, lower electrode pressure, planisher pressure, and upper and lower planisher roll pressures. By knowledge of acceptable pressure ranges for each of the components under which satisfactory weld and planishing results are obtained (i.e., dimensionally correct parts with required structural strength), the weld monitor system provides a record of real time environmental production data for each weld assembled part and production control input to the PLC based on such data as further explained below.

To also monitor the electrical conditions under which each of the resistance spot welds is formed, a current transformer coil 65 is electrically connected between the weld charge transformer 48 and the weld monitor system 50 to provide readings on current, including amperage and current pulse duration (i.e., number of weld cycles in 1/100th of a second), to the weld monitor system of the welding current applied to the upper and lower electrodes (according to the instructions of the weld controller 46) for each weld made. Similar to the monitoring of hydraulic pressures, by knowledge of acceptable current amperages and weld cycles (pulse duration and frequency) by which welds of adequate structural strength are produced, the weld monitor system 50 determines by comparator circuitry whether the welding pulse amperages, duration and frequencies are within predetermined ranges, records these values for each weld, and produces control signals to the PLC based upon the weld pulses monitored.

In the production of a particular brake shoe in which for example ten welds are to be made along the linear intersection of the web and rim, the weld monitor system 50 can be programmed, for example by entry of weld parameters to the monitor processor through a numeric keypad 63, to send a discrete output to the PLC 44 indicative of the pressure and current values of each of the analog inputs received upon completion of the series of ten welds. For example, each of the ten welds will have high and low limits for electrode current (including amperage, pulse duration in 1/100s cycles, and frequency) and at least six pressure readings including main hydraulic system pressure, upper electrode pressure, lower electrode (pressure ring) pressure, planisher pressure, and upper and lower planisher roll pressures. The electrode current and hydraulic pressures are monitored by the weld monitor system at a frequency of, for example, 1 kHz minimum per channel. Upon completion of the tenth weld, the discrete output in the form of an accept signal by the weld monitor system to the PLC along line 51 will be high only if all of the received values are within predetermined acceptable ranges. Conversely, the discrete output of the weld monitor system to the PLC in the form of a reject signal will be high if any one or any combination of the received values is outside of the predetermined acceptable ranges. The weld monitor system may also function as a control clock whereby if data on completion of all ten welds is not received by the monitor within a programmed amount of time a reject signal to the PLC will go high. In addition, such a reject signal can be held high until the monitor is ready to be triggered for the next series of welds. The PLC can be programmed to not trigger initiation of the welding process for the next part until the output state transitions from high to low.

In the case of analog values received by the weld monitor system indicative of upper or lower electrodes pressures or electrode currents (welding pulses) which are outside predetermined ranges (i.e., those values related to welding and not planishing) the reject signal from the weld monitor system to the PLC may further include instructions to the PLC to direct the swingarm assembly to remove the brakeshoe from the weld nest and drop it into a reject bin located, for example, below a position of the part-holding gripper when the swing arm is positioned 90 degrees from the position shown in FIG. 2. The PLC will count up to five non-conforming parts before suspending operation of the machine.

In the case of analog values received by the weld monitor system indicative of the planisher and/or planisher roll pressures (i.e., those values related to planishing and not welding) which are outside of predetermined ranges, a reject signal from the weld monitor system to the PLC will indicate that the parameter violations have occurred in the planishing operation whereby the PLC can either suspend operation of the machine upon receipt of five such signals as explained above, or control operation of the conveyer into which the brakeshoes are dropped from the planisher to allow removal of planisher-rejected brakeshoes.

The programmable high and low inputs for each of the high and low inputs can be checked against actual data on each and every weld. Each analog input will also have calibration capabilities for accurate pressure and current readings.

All of the data acquired by the weld monitor system is converted in an A/D converter 67 for storage a weld monitor data storage device 68 which may be, for example, a computer controlled digital data storage device from which the data may be printed or uploaded to a computer from which an archival computer tape backup can be recorded. All of the data acquired by the weld monitor system can also be displayed on a weld monitor display 70 in any desired format at any time such as, for example, data on each weld displayed upon completion of each weld series. A printer port from the weld monitor data storage device provides for a printer connection by which to print from the weld database on command (poll), print on fault, or print every tenth weld, etc.

A separate computer integrated manufacturing (CIM) system 49, such as the C.I.M. system manufactured by Hunkar Laboratories, Inc. of Cincinnati, Ohio, may be used in conjunction with the weld monitor system to perform statistical analysis on real time production data samples, as provided by the weld monitor system along line 47, to, for example, produce statistical process control charts indicative of physical trends of the production process. By direct connection to the weld monitor the CIM system is supplied with all of the data acquired by the weld monitor system to perform complete real time statistical analysis on all of the physical conditions monitored in the welding process.

In order to physically correlate all of the weld data collected by the weld monitor system to each brakeshoe, a brakeshoe identification system 72 is incorporated into the brake shoe welding machine in the position shown in FIG. 2. The brake shoe identification system 72 may be, for example, an ink jet spray device such as manufactured by VideoJet Systems International, Inc. of Wood Dale, Ill., which applies permanent unique part identifying indicia such as in the form of bar coding or sequential numbers, as assigned by the weld monitor system along line 73, to the outer peripheral surface 13 of rim blanks 23 as they are fed into the weld nest. Attachment of a brake lining to outer peripheral surface 13 protects the applied indicia from obliteration. The uniquely assigned identifying indicia for each rim blank (i.e., rim blank part numbers) is then correlated with the welding and planishing production data monitored in the welding and planishing operations performed on the brakeshoe to which the uniquely identified rim is attached and stored together (at a common address) in the weld monitor data storage device 68. By this arrangement the welding and planishing data for any brakeshoe can be readily retrieved from the weld monitor database automatically compiled by the weld monitor system. Such a part identification system is in compliance with ISO TPC standard 9000.

All of the circuitry of the weld monitor system 50 which performs the various described functions may be contained in a relatively small separate housing which may be located, for example, with the weld controller and/or PLC.

Although the invention has been shown and described with respect to a certain preferred embodiment, equivalent alterations and modifications of the embodiment disclosed are within the conceptual scope of this invention. For example, the weld monitor system of this invention may be used in connection with any type of automated welding operations and automatic welding machines such as pneumatic welding machines and machines which automatically form welds other than by resistance welding. The invention is applicable to any type of automated welding operation where it is desirable to monitor and measure both welding operations and machine motions and pressures which act on parts welded together by a machine. Monitoring and recording and controlling of other physical forces of welding operations not specifically addressed herein is also within the scope of this invention which is defined for now by the literal and equivalent scope of the present claims.

What is claimed is:

1. A weld monitor system for use with a resistance type welding machine having a welding electrode and a pressure applying compressive member which applies pressure to parts welded by the welding machine, the weld monitor system operative to monitor and record currents and pressures by which parts are joined by welding performed by the welding machine, and to monitor pressure applied by a compressive member to parts welded by the welding machine, the weld monitor system comprising:

a current transformer coil for measuring current applied to welding electrodes of the welding machine, at least one welding pressure transducer for measuring pressures applied by an electrode of the welding machine to parts joined by welding performed by the welding machine, at least one compressive member pressure transducer for measuring pressure applied by a compressive member of the welding machine to parts welded by the welding machine, and a recording device for recording values measured by the current transformer coil and the pressure transducers.

2. The weld monitor system of claim 1 wherein the current transformer coil also measures duration of welding current pulses applied to the welding electrodes of the welding machine.

3. The weld monitor system of claim 1 wherein at least one pressure transducer measures hydraulic pressure of a hydraulic system of the welding machine which operates to apply pressure to parts joined by welding.

4. The weld monitor system of claim 2 wherein one of the pressure transducers measures pressure of a welding electrode of the welding machine upon a part during application of a welding pulse to the welding electrode.

5. The weld monitor system of claim 1 wherein a pressure transducer measures pressure applied by a brake shoe gripping portion of a brake shoe welding machine to a brake shoe welded by the welding machine.

6. The weld monitor system of claim 1 wherein the forming component is a brake shoe forming planisher and one of the pressure transducers measures pressure applied by the brake shoe forming planisher of the welding machine upon a brake shoe weld assembled by the welding machine.

7. The weld monitor system of claim 1 wherein one of the pressure transducers measures pressure of a planisher roll in compressive contact with a part held in a planisher of the welding machine.

8. The weld monitor system of claim 1 wherein the recording device is a computerized data storage device.

9. The weld monitor system of claim 8 wherein said computerized data storage device further comprises at least one communication port through which data stored in the data storage device can be accessed.

10. The weld monitor system of claim 1 further comprising a video display for displaying in real time values of measurements of the current transformer coil and at least one pressure gauge.

11. The weld monitor system of claim 1 in combination with an automatic welding machine controlled by a programmable logic controller, the weld monitor system further comprising:
 a comparator for performing a comparison function on values measured by the current transformer coil and the pressure transducers to predetermined values, and
 a signal generator for generating a signal according to a result of the comparison function of the comparator and sending the signal to the programmable logic controller which controls the automatic welding machine in response to the signal.

12. The weld monitor of claim 1 further comprising a part identification device which automatically applies permanent unique indicia determined by the weld monitor system to parts joined by welding performed by the welding machine.

13. The weld monitor system of claim 12 wherein measurements of the current transformer coil and corresponding measurements of the pressure transducers made during welding of a part are correlated in the recording device to the unique indicia applied to the same part.

14. A method of monitoring physical conditions under which parts are welded together and formed by an automatic welding machine, the method of monitoring comprising the steps of:
 measuring current applied to a plurality of welding electrodes of the welding machine placed in contact with parts to be welded together, and
 simultaneously measuring corresponding pressures in hydraulic circuits of the welding machine which hydraulically power placement of the electrodes in contact with the parts and placement of a compressive member of the welding machine in contact with parts welded together by the automatic welding machine.

15. The method of claim 14 further comprising the step of recording the measured current and pressures.

16. The method of claim 15 further comprising the step of applying unique indicia to parts joined by welding performed by the automatic welding machine and storing values of current and pressure measured in welding of each part in corresponding arrangement with the applied unique indicia.

17. The method of claim 14 further comprising the step of comparing the measured current and pressures to predetermined values and producing a signal to a welding machine controller indicative of results of the comparisons.

18. The method of claim 14 further comprising the step of sending signals representative of the measured current and pressures to a real time welding data sampling device.

19. The method of claim 14 applied to monitoring the welding operations of an automatic brake shoe welding machine.

20. A weld monitor device which monitors physical conditions under which parts are joined by welding performed by a welding machine, the weld monitor device comprising:
 a current measuring device for measuring a weld current applied to a weld electrode of the welding machine,
 a first pressure sensing device for measuring a mechanical pressure applied by an electrode of the welding machine to parts joined by welding performed by the welding machine, and
 a second pressure sensing device for measuring a mechanical pressure applied by a compressive member of the welding machine.

21. The weld monitor device of claim 20 wherein the current measuring device for measuring a weld current applied to a weld electrode of a welding machine measures amperes and duration of weld cycles.

22. The weld monitor device of claim 20 wherein the pressure sensing device for measuring a physical pressure applied by the welding machine to parts joined by welding performed by the welding machine during a welding operation is a hydraulic transducer in a hydraulic circuit operative to apply pressure to parts joined by welding by the welding machine.

23. The weld monitor device of claim 20 further comprising means for recording weld current and physical pressures measured by the weld monitor device during joining of parts by welding performed by the welding machine.

24. The weld monitor device of claim 20 further comprising means for displaying weld electrode current and physical pressures measured by the weld monitor device during joining of parts by welding performed by the welding machine.

25. A brake shoe welding machine monitoring, marking and recording system for use with an automatic brake shoe resistance welding machine, the system comprising,
 a current measuring device for measuring current applied to a welding electrode of the welding machine placed in contact with parts to be joined by welds into the form of a brake shoe,
 a first pressure measuring device for measuring a pressure of the contact of said welding electrode upon the parts,
 a second pressure measuring device for measuring a pressure applied by a brake shoe forming planisher of the welding machine to the parts joined by welds into the form of a brake shoe,
 signal generators connected to said pressure measuring devices for generating signals indicative of the pressure measurements of said first and second pressure measuring devices,
 a marking device for applying permanent unique markings to at least one part of each brake shoe formed by parts joined by welds,
 a marking device for applying permanent unique markings to at least one part of each brake shoe formed by parts joined by welds,
 a marking signal generator for generating signals indicative of said unique markings, said marking signal generator connected to said electronic storage device, and
 an electronic storage device connected to said signal generators for storing said signals.

* * * * *

UNITED STATES PATENT AND TRADEMARK OFFICE
CERTIFICATE OF CORRECTION

PATENT NO. : 5,397,872
DATED : Mar. 14, 1995
INVENTOR(S) : Baker, et al

It is certified that error appears in the above-indentified patent and that said Letters Patent is hereby corrected as shown below:

Col. 10, lines 60-62, please delete "a marking device for applying permanent unique markings to at least one part of each brake shoe formed by parts joined by welds,"

Signed and Sealed this

Nineteenth Day of September, 1995

Attest:

BRUCE LEHMAN

Attesting Officer    Commissioner of Patents and Trademarks